(12) United States Patent
Smith et al.

(10) Patent No.: US 12,540,911 B2
(45) Date of Patent: Feb. 3, 2026

(54) AUTO-CALIBRATION pH SENSOR (71) Applicant: Sensorex Corporation, Garden Grove, CA (US)

(72) Inventors: Alex D. Smith, La Habra, CA (US); Albert Haizhen Zhou, Diamond Bar, CA (US); Jose Tafolla, Wilmington, CA (US); Michael Francis Ross, Huntington Beach, CA (US); Hamed Shadpour, Mission Viejo, CA (US)

(73) Assignee: Sensorex Corporation, Garden Grove, CA (US)

( * ) Notice: Subject to any disclaimer, the term of this patent is extended or adjusted under 35 U.S.C. 154(b) by 215 days.

(21) Appl. No.: 18/224,878

(22) Filed: Jul. 21, 2023

(65) Prior Publication Data

US 2024/0027388 A1 Jan. 25, 2024

Related U.S. Application Data

(60) Provisional application No. 63/391,412, filed on Jul. 22, 2022.

(51) Int. Cl.
*G01N 27/416* (2006.01)
*G01N 27/30* (2006.01)

(52) U.S. Cl.
CPC ......... *G01N 27/302* (2013.01); *G01N 27/301* (2013.01); *G01N 27/4165* (2013.01); *G01N 27/4167* (2013.01)

(58) Field of Classification Search
CPC .............. G01N 27/302; G01N 27/301; G01N 27/4165; G01N 27/4167; G01N 27/4035
See application file for complete search history.

(56) References Cited

U.S. PATENT DOCUMENTS 4,686,011 A * 8/1987 Jackle ................ G01N 27/4035
324/438
5,766,432 A * 6/1998 Dunn .................... A61B 5/1495
204/406

(Continued)

FOREIGN PATENT DOCUMENTS

| JP | 2016001163 A | 1/2016 |
| JP | 2021117096 A | 8/2021 |
| JP | 2021169950 A | 10/2021 |

OTHER PUBLICATIONS

Petr Vanysek, "The Glass Electrode", The Electrochemical Society Interface · Summer 2004, pp. 19-20 (Year: 2004).*

*Primary Examiner* — Alexander S Noguerola
(74) *Attorney, Agent, or Firm* — Dinsmore & Shohl LLP (57) ABSTRACT

A pH sensor comprising pH sensing instrumentation, reference sensing instrumentation, an electrochemical junction, and a pH determination unit. The pH sensing instrumentation comprises a pH fluid, a pH fluid chamber, a pH sensing chamber, and a measuring electrode extending through the pH fluid chamber and comprising a tip that resides in the pH sensing chamber. The reference sensing instrumentation comprises a reference fluid, a reference chamber filled with the reference fluid, a reference electrode immersed in the reference fluid, and monitoring instrumentation. The monitoring instrumentation comprises a monitoring fluid, a monitoring fluid chamber, a monitoring sensing chamber filled with the monitoring fluid, and a monitoring electrode extending through the monitoring fluid chamber and comprising a tip that resides in the monitoring sensing chamber. The monitoring fluid chamber and the monitoring sensing chamber are immersed in the reference fluid.

19 Claims, 1 Drawing Sheet

(56) References Cited

U.S. PATENT DOCUMENTS

2003/0150726 A1* 8/2003 West ................ G01N 27/36
                                                                204/435
2008/0120827 A1   5/2008 Woodward et al.

* cited by examiner

FIG. 1

FIG. 2

AUTO-CALIBRATION pH SENSOR

CROSS REFERENCE TO RELATED APPLICATION

This application claims the benefit of U.S. Provisional Patent Application Ser. No. 63/391,412 entitled "Auto-Calibration pH Sensor," filed Jul. 22, 2022, the entire contents of which are incorporated herein by reference.

TECHNICAL FIELD

The present specification generally relates to pH sensors and, more specifically, to potentiometric pH sensors having drift compensation and/or auto-calibration features.

BACKGROUND pH sensors are use in a wide variety of continuous and batch monitoring and control applications including, but not limited to, industrial process control, water and wastewater treatment, food and beverage processing, and pharmaceutical production. Over time, the accuracy of pH sensors may be reduced thereby requiring manual intervention and recalibration. Manual intervention may require the removal of a pH sensor from a field installation, which may cause significant downtime and/or require technicians to work in freezing temperature conditions. Therefore, there exists a need for pH sensors capable of addressing developed inaccuracies without the need for manual intervention.

SUMMARY

The pH sensor of the present disclosure utilizes the potentiometric method of determining the pH of a test sample. The determination of pH using a potentiometric pH sensor requires the measurement of a voltage. In order to measure the voltage, two points with different electrical potential values (i.e., electrical signals) are required.

The pH sensor of the present disclosure comprises a pH sensing chamber connected to a distal end of a pH fluid chamber. The pH sensing chamber comprises a pH-sensitive glass membrane that may be formed into a spherical bulb, hemisphere, or flat end. The pH fluid chamber comprises a pH-insensitive glass that may be formed into a tube. The pH sensing chamber and pH fluid chamber are fluidly connected and filled with a fluid of known hydrogen ion activity. A measuring electrode extends through the pH fluid chamber and into the pH sensing chamber, from which a first electrochemical potential value is detected. When the pH sensing chamber is immersed in a test sample, the detected electrochemical potential depends on a difference in hydrogen ion activity between the fluid filling the pH sensing chamber and the test sample. It should be noted that in the context of the present disclosure, "electrochemical potential" refers to a reduction potential associated with the electrochemistry of an electrode, i.e., in units of voltage, and does not refer to a thermodynamic measure of chemical potential, i.e., in units of energy per mole.

A second electrochemical potential is detected at a reference electrode that is designed to maintain a constant electrochemical potential independent of the test sample composition and temperature. To accomplish this, the reference electrode is immersed in a reference fluid designed to maintain, to the extent possible, a constant electrochemical potential of the reference electrode. The difference between these electrochemical potentials, the voltage, may be used to determine the pH of the test sample based on the Nernst equation.

In order to complete the electrical circuit between the measuring electrode and the reference electrode, an electrochemical junction is needed to fluidly connect the reference fluid (containing the reference electrode) with the test sample in contact with the pH sensing chamber (containing the measuring electrode therein). However, the electrochemical junction, while needed to complete the electrical circuit, also introduces the potential for contamination of the reference fluid, i.e., a change in the chemistry of the reference fluid. There are three main ways in which the reference fluid can become contaminated: (i) dilution, where some portion of the internal reference fluid is replaced by external fluid at a lower salt concentration; (ii) concentration, where the salt content of the external fluid is much higher than the reference fluid and some portion of the internal fluid is replaced by external fluid at a higher salt concentration; and (iii) chemical poisoning, where certain chemicals from the external fluid enter the reference fluid and undergo a chemical reaction with components of the reference fluid.

Contamination of the reference fluid may cause the electrochemical potential of the reference electrode to drift, thus making the above-described voltage between the measurement electrode and the reference electrode dependent on more than just the hydrogen ion activity on either side of the pH-sensitive glass membrane. In this manner, chemical contamination of the reference fluid—and the resulting drift of the reference electrode—may severely degrade the performance of the pH sensor. Accordingly, a need exists for potentiometric pH sensors that are able to detect and compensate for drift of the reference electrode.

Moreover, with prolonged use and/or exposure to elevated temperatures, the pH-sensitive glass membrane of the pH sensor may begin to exhibit diminished response to pH changes (e.g., in terms of sensitivity of mV per unit of pH). This aging phenomenon is separate from the reference electrode drift attributed to the reference fluid becoming contaminated over time. However, as with drift of the reference electrode, aging of the pH-sensitive glass membrane may also serve as a source of inaccuracy in pH measurements. Accordingly, a need exists for potentiometric pH sensors that are able to auto-calibrate to account for aging effects of the pH sensitive glass membrane.

The subject matter of the present disclosure is directed to a pH sensor that incorporates monitoring instrumentation capable of performing real-time in-situ measurements of the electrochemical potential drift of the reference electrode while also capturing aging effects associated with the pH-sensitive glass membrane.

BRIEF DESCRIPTION OF THE DRAWINGS

The following detailed description of specific embodiments of the present disclosure can be best understood when read in conjunction with the following drawings, in which.

DETAILED DESCRIPTION OF THE INVENTION

Figure 1:
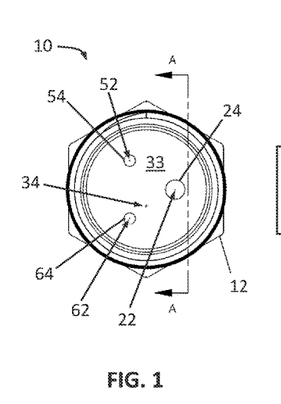
FIG. 1 is an end view of the pH sensor of the present disclosure, according one embodiment contemplated under the present disclosure.
Figure 2:
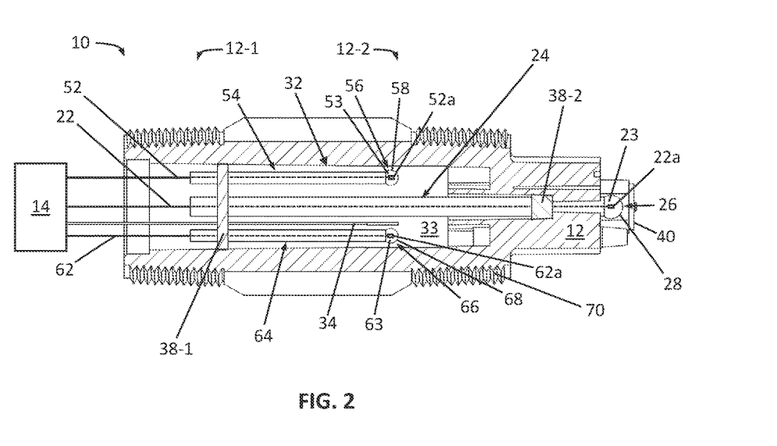
FIG. 2 shows a cross-sectional view along line A-A of the pH sensor of FIG. 1.

With reference now to FIGS. 1 and 2, a pH sensor 10 of the present disclosure is shown and described. The pH sensor 10 comprises a sensor housing 12 and pH determination unit 14. The sensor housing 12 comprises pH sensing instrumentation, reference sensing instrumentation, and an electrochemical junction 40.

The pH sensing instrumentation may comprise a measuring electrode 22, a pH fluid 23, a pH fluid chamber 24, a pH sensing chamber 26. The measuring electrode 22, the pH fluid 23, the pH fluid chamber 24, and the pH sensing chamber 26 may define a pH sensing electrode assembly. In embodiments, the pH fluid chamber 24 and the pH sensing chamber 26 may together comprise a monolithic piece of glass with the pH sensing chamber 26 positioned at a distal end of the pH fluid chamber 24. In other embodiments, the pH fluid chamber 24 and the pH sensing chamber 26 are separate pieces of glass that are connected, such as, for example, by fusing the pH sensing chamber 26 to the distal end of the pH fluid chamber 24. The pH fluid chamber 24 and the pH sensing chamber 26 may together comprise any suitable shape depending on the characteristics of a test sample to be measured. The sensor housing 12 of the pH sensor 10 shown in FIGS. 1 and 2 comprises threading 70, which may be used for inserting the pH sensor 10 into a pipe or tank. The threading 70 may allow for mechanically robust mating between the pipe or tank and the sensor housing 12 such that leaks are avoided at the point of mounting.

The pH sensing chamber 26 may comprise a pH-sensitive glass membrane 28 and may be formed into any suitable shape such as a spherical or hemispherical bulb, a cone, a cylinder, a spear, or a flat end. The shape of the pH sensing chamber 26 may vary so as to ensure optimal moistening of the pH-sensitive glass membrane 28. While bulb-shaped and coned-shaped pH sensing chambers 26 may be used for most applications, some applications may require a spear-tipped pH sensing chamber 26, such as applications that require the penetration of a semi-solid test sample. However, other applications may require a flat pH sensing chamber 26, such as applications that require the measurement of a solid surface, such as, for example, skin.

The pH fluid chamber 24 may be made of a pH-insensitive glass and may comprise any suitable shape. In embodiments, the pH fluid chamber 24 may be cylindrical, cubical, or have a discontinuous shape. In preferred embodiments, the pH fluid chamber 24 is in the form of a cylindrically shaped tube. The pH fluid chamber 24 and pH sensing chamber 26 may be fluidly coupled and filled with the pH fluid 23, which may be a solution of known pH.

The measuring electrode 22 may extend longitudinally through the pH fluid chamber 24 with a tip 22a of the measuring electrode 22 residing in the pH sensing chamber 26. The measuring electrode 22 may comprise any suitable materials capable of functioning as a reversible redox electrode. Some suitable materials for the measuring electrode 22 include, without limitation, Ag/AgCl, $Hg/Hg_2Cl_2$, iodine/iodide, $Cu/CuSO_4$, Hg/HgO, and ferric/ferrous compositions. For example, the measuring electrode 22 may comprise a Ag wire extending longitudinally through the pH fluid chamber 24, and the tip 22a of the measuring electrode 22 may comprise a AgCl coating.

With continued reference to FIGS. 1 and 2, the reference sensing instrumentation may comprise a reference fluid 33 and a reference chamber 32 that is filled with the reference fluid 33. The reference fluid 33 may be one of known pH and may comprise a sufficient buffer capacity so as to limit pH changes to the reference fluid in response to the contamination issues discussed above. The pH fluid chamber of the pH sensing instrumentation may extend through the reference chamber 32 of the reference sensing instrumentation.

The reference sensing instrumentation may further comprise a reference electrode 34 immersed in the reference fluid 33. The reference electrode 34 may be a wire that is in contact with the reference fluid 33. The reference electrode 34 may comprise any suitable materials capable of functioning as a reversible redox electrode. Some suitable materials of the reference electrode 34 include, without limitation, Ag/AgCl, $Hg/Hg_2Cl_2$, iodine/iodide, $Cu/CuSO_4$, Hg/HgO, and ferric/ferrous compositions. For example, the reference electrode 34 may comprise a Ag wire extending longitudinally through the reference chamber 32, and a tip 32a of the reference electrode 34 may comprise a AgCl coating. The reference electrode 34 may be in contact with reference fluid 33 such that the tip 32a of the reference electrode, e.g., the Ag/AgCl coating, may be in direct contact with the reference fluid 33 without a glass membrane therebetween.

The reference sensing instrumentation may further comprise monitoring instrumentation, components of which may also be immersed in the reference fluid 33 filling the reference chamber 32. The monitoring instrumentation may comprise a monitoring electrode 52, a monitoring fluid 53, a monitoring fluid chamber 54, and a monitoring sensing chamber 56. The monitoring electrode 52, the monitoring fluid 53, the monitoring fluid chamber 54, and the monitoring sensing chamber 56 may define a monitoring electrode assembly. The monitoring electrode assembly may allow for the monitoring of the drift of the electrochemical potential of the reference electrode 34 caused by contamination of the reference fluid 33 in the reference chamber 32. It is not ideal to merely place another reference wire into the reference fluid, as the second hypothetical reference wire would be subject to the same drift in electrochemical potential drift that the reference electrode 34 is subject to.

The monitoring fluid chamber 54 and the monitoring sensing chamber 56 may be immersed in the reference fluid 33. In embodiments, the monitoring fluid chamber 54 and the monitoring sensing chamber 56 may together comprise a monolithic piece of glass with the monitoring sensing chamber 56 positioned at a distal end of the monitoring fluid chamber 54. In other embodiments, the monitoring fluid chamber 54 and the monitoring sensing chamber 56 are separate pieces of glass that are connected, such as, for example, by fusing the monitoring sensing chamber 56 to the distal end of the monitoring fluid chamber 54. The monitoring fluid chamber 54 and the monitoring sensing chamber 56 may together comprise any suitable shape. For example, in embodiments, the shape and position of the monitoring fluid chamber 54 and the monitoring sensing chamber 56 may be determined based on the size and shape of the reference chamber 32. The shape and position of the monitoring fluid chamber 54 and the monitoring sensing chamber 56 may also be determined based on size, shape, and arrangement of the pH sensing instrumentation extending through the reference chamber 32, e.g., the pH fluid chamber 24, as well as the arrangement of the reference electrode 34 within the reference chamber 32.

The monitoring sensing chamber 56 may comprise a pH-sensitive glass membrane 58 and may be formed into any a suitable shape such as a spherical or hemispherical bulb, a cone, a cylinder, a spear, or a flat end. In preferred embodiments, the monitoring sensing chamber 56 comprises a hemispherical bulb. The monitoring fluid chamber 54 may be made of a pH-insensitive glass and may comprise any suitable shape. In embodiments, monitoring fluid chamber 54 may be cylindrical, cubical, or have a discontinuous shape. In preferred embodiments, the monitoring fluid chamber 54 is in the form of a cylindrically shaped tube. In embodiments, the monitoring fluid chamber 54 is in the form of a cylindrically shaped tube that is immersed in the reference fluid 33 such that an outer cylinder of the cylindrically shaped tube is exposed to the reference fluid 33. The monitoring fluid chamber 54 and monitoring sensing chamber 56 may be fluidly coupled and filled with the monitoring fluid 53, which may be a solution of known pH.

The monitoring electrode 52 may extend longitudinally through the monitoring fluid chamber 54 with a tip 52a of the monitoring electrode 52 residing in the monitoring sensing chamber 56. The monitoring electrode 52 may comprise any suitable materials capable of functioning as a reversible redox electrode. Some suitable materials of the monitoring electrode 52 include, without limitation, Ag/AgCl, $Hg/Hg_2Cl_2$, iodine/iodide, $Cu/CuSO_4$, Hg/HgO, and ferric/ferrous compositions. For example, the monitoring electrode 52 may comprise a Ag wire extending longitudinally through the monitoring fluid chamber 54, and the tip 52a of the monitoring electrode 52 may comprise a AgCl coating.

The monitoring instrumentation may further comprise an additional monitoring electrode 62, an additional monitoring fluid 63, an additional monitoring fluid chamber 64, and an additional monitoring sensing chamber 66. The additional monitoring electrode 62, the additional monitoring fluid 63, the additional monitoring fluid chamber 64, and the additional monitoring sensing chamber 66 may define an additional monitoring electrode assembly. The additional monitoring fluid chamber 64 and the additional monitoring sensing chamber 66 may be immersed in the reference fluid 33. In embodiments, the additional monitoring fluid chamber 64 and the additional monitoring sensing chamber 66 may together comprise a monolithic piece of glass with the additional monitoring sensing chamber 66 positioned at a distal end of the additional monitoring fluid chamber 64. In other embodiments, the additional monitoring fluid chamber 64 and the additional monitoring sensing chamber 66 are separate pieces of glass that are connected, such as, for example, by fusing the additional monitoring sensing chamber 66 to the distal end of the additional monitoring fluid chamber 64. The additional monitoring fluid chamber 64 and the additional monitoring sensing chamber 66 may together comprise any suitable shape. For example, in embodiments, the shape and position of the additional monitoring fluid chamber 64 and the additional monitoring sensing chamber 66 may be determined based on the size and shape of the reference chamber 32. The shape and position of the additional monitoring fluid chamber 64 and the additional monitoring sensing chamber 66 may also be determined based on size, shape, and arrangement of the pH sensing instrumentation extending through the reference chamber 32 and the monitoring fluid chamber 54 and monitoring sensing chamber 56 immersed in the reference fluid 33 of the reference chamber. Additionally, the shape and position of the additional monitoring fluid chamber 64 and the additional monitoring sensing chamber 66 may be determined based on the arrangement of the reference electrode 34 within the reference chamber 32.

The additional monitoring sensing chamber 66 may comprise a pH-sensitive glass membrane 68 and may be formed into any a suitable shape such as a spherical or hemispherical bulb, a cone, a cylinder, a spear, or a flat end. In preferred embodiments, the additional monitoring sensing chamber 66 comprises a hemispherical bulb. The additional monitoring fluid chamber 64 may be made of a pH-insensitive glass and may comprise any suitable shape. In embodiments, additional monitoring fluid chamber 64 may be cylindrical, cubical, or have a discontinuous shape. In preferred embodiments, the additional monitoring fluid chamber 64 is in the form of a cylindrically shaped tube. The additional monitoring fluid chamber 64 and additional monitoring sensing chamber 66 may be fluidly coupled and filled with the additional monitoring fluid 63, which may be a solution of known pH.

The additional monitoring electrode 62 may extend longitudinally through the additional monitoring fluid chamber 64 with a tip 62a of the additional monitoring electrode 62 residing in the additional monitoring sensing chamber 66. The additional monitoring electrode 62 may comprise any suitable materials capable of functioning as a reversible redox electrode. Some suitable materials of the additional monitoring electrode 62 include, without limitation, Ag/AgCl, $Hg/Hg_2Cl_2$, iodine/iodide, $Cu/CuSO_4$, Hg/HgO, and ferric/ferrous compositions. For example, the additional monitoring electrode 62 may comprise a Ag wire extending longitudinally through the additional monitoring fluid chamber 64, and the tip 62a of the additional monitoring electrode 62 may comprise a AgCl coating.

In embodiments, the monitoring instrumentation of the pH sensor 10 may comprise more than one additional monitoring electrode assembly. For example, in embodiments, the monitoring instrumentation may comprise a first additional monitoring electrode assembly comprising a first additional monitoring electrode, a first additional monitoring fluid, a first additional monitoring fluid chamber, and a first additional monitoring sensing chamber. The monitoring instrumentation may further comprises a second additional monitoring electrode assembly comprising a second additional monitoring electrode, a second additional monitoring fluid, a second additional monitoring fluid chamber, and a second additional monitoring sensing chamber. The first and second additional monitoring electrode assemblies may comprise the same structure and function as that described above for the additional monitoring electrode assembly.

The pH fluid chamber 24, the reference electrode 34, the monitoring fluid chamber 54, and the additional monitoring fluid chamber 64 may extend through and be supported by a first fluid partition 38-1 at a device-side 12-1 of the sensor housing 12. The pH fluid chamber 24 may extend through and be supported by a second fluid partition 38-2 at a sensing-side 12-2 of the sensor housing 12. The first fluid partition 38-1 and the second fluid partition 38-2 may be supported within the sensor housing 12.

The electrochemical junction 40 may be configured to fluidly connect the reference fluid with a test sample placed in contact with the pH sensing chamber 26. The electrochemical junction 40 may comprise a fluid permeable material in the form of a ceramic, a glass ceramic, a metal, or any of a variety of fibrous or non-fibrous fluid permeable materials. For example, and not by way of limitation, suitable materials include Pellon®, ceramic, platinum, glass, ground glass, or plastic fibers.

The pH determination unit 14 may comprise at least one processor, at least one memory module communicatively coupled to the at least one processor, and machine readable and executable instructions stored on the at least one memory module. The pH determination unit 14 may be electrically connected to the measuring electrode 22 of the pH sensing instrumentation, the reference electrode 34 of the reference sensing instrumentation, the monitoring electrode 52 of the monitoring instrumentation, and, if present, any additional monitoring electrodes of the pH sensor The pH determination unit 14 may be configured to measure (i) a first voltage between the measuring electrode 22 and the reference electrode 34 and (ii) a second voltage between the reference electrode 34 and the monitoring electrode 52. If additional monitoring electrodes are present, the pH determination unit 14 may also be configured to measure respective voltages between the additional monitoring electrodes and the reference electrode 34. For example, in embodiments wherein the monitoring instrumentation comprises the additional monitoring electrode assembly, the pH determination unit 14 may be configured to measure the voltage between the reference electrode 34 and the additional monitoring electrode 62.

It should be understood that while the pH determination unit 14 is described as measuring the voltage between various electrodes, in embodiments, the pH determination unit 14 may indirectly measure the voltage between electrodes by measuring the potential of each electrode individually, e.g., with respect to a liquid earth electrode residing in the reference fluid 33, and then comparing the individually determined electrode potentials.

The pH determination unit 14 may comprise a pH determination algorithm stored on the at least one memory module, which may be executed by the at least one processor of the pH determination unit 14 to calculate a third voltage based on at least the first voltage and the second voltage. The pH determination algorithm may then be used to convert the third voltage to a pH signal corresponding to the pH of the a test sample. It should be understood that while the pH sensor 10 is described in embodiments as including the pH determination algorithm as part of the pH determination unit 14, some or all of the calculations and conversions required to determine the pH of a test sample need not to be performed locally within the pH determination unit 14. For example, those skilled in the art would understand that raw measured values may be transmitted to another device for the relevant calculations and conversions to be performed remotely from the pH sensor 10.

In embodiments, the pH sensor 10 may further comprise a ion-selective field effect transistor (ISFET) immersed in the reference fluid 33. The ISFET (not shown in FIGS. 1 and 2) may serve as an internal electrode capable of detecting electrochemical drift of the reference electrode 34.

The remaining portion of the present disclosure describes the operating principles of the pH sensor 10 having the above-described structure and explains how said structure may provide the pH sensor with drift compensation and auto-calibration features.

The present disclosure describes a pH sensor 10 and method for determining the pH of a test sample wherein the electrochemical potential drift of the reference electrode 34 may be monitored independent of the measuring electrode 22. As mentioned above, it is not ideal to merely place another reference wire into the reference fluid 33 as the second hypothetical reference wire would be subject to the same potential drift experienced by the reference electrode 34. Rather, it is preferred to implement monitoring instrumentation that is relatively unaffected by chemical contamination that may cause drift of the reference electrode 34. The pH sensor 10 of the present disclosure achieves this by incorporating the monitoring electrode 52 within a monitoring sensing chamber 56 and monitoring fluid chamber 54, similar to the way the measuring electrode 22 is incorporated within the pH sensing chamber 26 and pH fluid chamber 24 of the pH sensing instrumentation. Accordingly, the monitoring electrode 52 of the present disclosure is protected behind the glass barrier formed by the monitoring sensing chamber 56 and the monitoring fluid chamber 54, with the monitoring sensing chamber 56 and the monitoring fluid chamber 54 being immersed in the reference fluid 33. Incorporating the monitoring electrode 52 in this arrangement permits the measurement of a voltage between the reference electrode 34 and the monitoring electrode 52 that is predominantly influenced by drift of the reference electrode 34 and pH changes of the reference fluid 33. However, appropriate control of the buffer capacity of the reference fluid 33 permits minimal pH changes for the reference fluid 33 as a result of chemical dilution, concentration, or acid/base addition. Therefore, changes to the measured voltage between the reference electrode 34 and the monitoring electrode 52 may be attributed to drift of the reference electrode 34.

A electrochemical junction between the reference electrode 34 and the monitoring electrode 52 is unnecessary because the pH-sensitive glass membrane 58 protecting the monitoring electrode 52 is in direct contact with the reference fluid 33 in which the reference electrode 34 is also immersed. The monitoring instrumentation is therefore able to provide a substantially constant electrochemical potential which can be measured against the electrochemical potential of the reference electrode 34 to indicate the degree of drift experienced by the reference electrode 34 as a result of chemical contamination of the reference fluid 33. It should be noted that the electrochemical potential of the monitoring electrode 52 may exhibit some variation as the chemistry of the reference fluid 33 changes. However, without wishing to be bound by theory, this variation is expected to be minimal relative to the corresponding drift of the reference electrode 34.

The electrochemical potential difference between the reference electrode 34 and the monitoring electrode 52 may be monitored periodically with the readings stored. During normal operation, the reference fluid 33 will tend to become progressively more contaminated over time. This will cause depolarization of the reference electrode 34 away from its original electrochemical potential, and the electrochemical potential difference between the reference electrode 34 and the monitoring electrode 52 will reflect this depolarization. Therefore, by comparing the dynamic potential difference between the reference electrode 34 and the monitoring electrode 52, the extent of drift (e.g., in millivolts) of the reference electrode 34 can be quantified. The pH determination algorithm may then compensate for the drift by yielding a corrected signal to the pH sensor 10.

The pH determination unit 14 may be an electronics unit featuring two voltage input channels, F1 and F2, and one voltage output channel, F3. The first input channel, F1, may be a first voltage corresponding to the difference between the potential $V_{pH}$ of the measuring electrode 22 and the potential $V_R$ of the reference electrode 34, as shown in Equation (1) below. The second input channel, F2, may be a second voltage corresponding to the difference between the potential $V_R$ of the reference electrode 34 and the potential $V_m$ monitoring electrode 52, as shown in Equation (2) below.

$$F1 = V_{pH} - V_R \tag{1}$$

$$F2 = V_R - V_m \tag{2}$$

As the reference fluid 33 becomes contaminated, the reference electrode 34 may become depolarized away from its original electrochemical potential $V_{R,0}$ by some drift amount $\Delta V_R$. After a period of time, t, this change in potential affects both channels F1 and F2, which are expressed below in Equations (3) and (4) as dynamic values:

$$F1(t) = V_{pH,t} - (V_{R,0} + \Delta V_{R,t}) \tag{3}$$

$$F2(t) = (V_{R,0} + \Delta V_{R,t}) - V_{m,t} \tag{4}$$

In order to determine the drift in the potential $V_R$ of the reference electrode 34, $\Delta V_R$, the dynamic value F2(t) at channel F2 may be compared with an originally stored value for the second voltage, i.e., an initial second voltage, F2(0).

$$\Delta V_{R,t} = F2(t) - F2(0) \quad (5)$$

The voltage output channel, F3, may therefore be a drift-compensated pH signal, expressed in voltage as a dynamic value, as:

$$F3(t) = F1(t) - \Delta V_{R,t} \quad (6)$$

Using this approach, the monitoring electrode 52, protected from chemical contamination by the glass barrier formed by the monitoring fluid chamber 54 and the monitoring sensing chamber 56, can be used to detect drift of the reference electrode 34. As discussed above, the identification of the extent of drift can be used to correct otherwise erroneous readings of a pH sensor.

As described above, the monitoring electrode 52 is isolated from the reference fluid 33 by the glass barrier formed by the monitoring fluid chamber 54 and the monitoring sensing chamber 56. The electrochemical potential difference measured between the monitoring electrode 52 and the reference electrode 34 is therefore similar in nature to the pH measurement obtained by measuring the difference in electrochemical potential between the measuring electrode 22 and the reference electrode 34. This arrangement enables another feature of the pH sensors of the present disclosure, auto-calibration.

A conventional pH sensor requires frequent calibration in standardized pH buffers. This is because pH is not measured directly; rather, it is inferred by comparing the measured voltage between the measurement electrode and the reference electrode with voltage measurements performed on solutions with known pH. The pH sensor measures the glass membrane potential in millivolts, and the reading is compared to measurements made in known standards. The traditional process of calibration involves sequentially placing the pH sensing chamber 26 of the pH sensor 10 into a set of standard pH solutions (i.e., pH calibration solutions), waiting for the measured voltage between the measuring electrode 22 and the reference electrode 34 to stabilize, and providing the pH determination unit 14 with the pH value corresponding to the stabilized voltage measurements. This process can be cumbersome in field installations, where removing a sensor from a process line may cause significant downtime and/or require working in freezing temperature conditions where pH buffers may freeze. Moreover, standard pH solutions may not be readily available in some field installations.

As discussed above, as the pH-sensitive glass membrane 28 of the pH sensing chamber ages, the pH-sensitive glass may begin to exhibit diminished response to pH changes (e.g., in terms of sensitivity of mV per unit of pH). Such aging effects may occur after prolonged use or exposure to elevated temperatures. This aging phenomenon is separate from the reference electrode drift attributed to the reference fluid becoming contaminated over time. The aging of the pH-sensitive glass may cause inaccurate pH readings, for a change in the sensitivity of the pH glass will alter the voltage reading for particular pH values of the test sample. For example, if the originally calibrated response to pH 4 solution were 177 mV (voltage between the measuring electrode 22 and the reference electrode 34), and after prolonged use or elevated temperature exposure, the actual sensor reading in pH 4 solution was 160 mV, that would result in a pH measurement error. The pH sensor would normally require recalibration using standardized pH buffers referenced above, and the pH sensor would need to be removed from the field installation for recalibration, which may involve significant process downtime.

However, the pH sensor 10 of the present disclosure may include an auto-calibration feature that avoids the need for the re-calibration process discussed above and the requirement of removing the sensor from the field installation. The auto-calibration feature of the present disclosure may be enabled by the incorporation of the monitoring instrumentation discussed above into the pH sensor 10. In particular, the auto-calibration functionality may be achieved by measuring the potential between one or more monitoring electrodes and the reference electrode 34, and assigning a standard pH value(s) to the measurement(s). As the pH-sensitive glass membrane 58 of the monitoring sensing chamber 56 ages, the voltage between the monitoring electrode 52 and the reference electrode 34 may reflect this aging, given the substantially constant pH of the monitoring fluid 53 and substantially constant pH of the reference fluid 33 in which the monitoring sensing chamber 56 is immersed. Moreover, without wishing to be bound by theory, it is believed that the degree of aging experienced by the pH-sensitive glass membrane 58 of the monitoring sensing chamber 56 will be similar to the aging experienced by the pH-sensitive glass membrane 28 of the pH sensing chamber 26. Therefore, this process mirrors conventional pH calibration, save that it transpires completely internal to the reference half-cell of a pH sensor as the standardizing solutions, i.e., the monitoring fluid(s), are internal to the pH sensor 10. In embodiments, the auto-calibration feature may compensate for both drift at the reference electrode and aging of the pH-sensitive glass membrane 28 of the pH sensing chamber 26.

As discussed above, in embodiments of the present disclosure, multiple monitoring electrode assemblies, i.e., glass electrodes, may be placed in the reference fluid 33 of the reference sensing instrumentation. These embodiments may permit a multi-point calibration, which is a common technique used in many applications in order to achieve more accurate pH measurements. As discussed above, in pH sensors, this method typically consists of assigning a measured voltage in a standardized buffer to be that buffer's known pH value (for example, pH 7) and then assigning a second measured voltage in a different standardized buffer to be the other buffer's known pH value (for example, pH 4). The relationship between pH and the measured voltage between the measuring electrode 22 and the reference electrode 34 may be represented graphically by a straight line connecting these points. However, nonlinear fits may also be employed. In any case, an equation used to approximate the relationship between pH and the measured voltage between the reference electrode 34 and the measuring electrode 22 may be used to convert the measured voltage between the reference electrode 34 and the measuring electrode 22, when performing pH measurements on test samples, into a pH value corresponding to the pH of the test sample.

In embodiments of the pH sensor 10 having two-point calibration functionality, auto-calibration may be achieved by measuring (i) the voltage between the monitoring electrode 52 and reference electrode 34 and (ii) the voltage between the additional monitoring electrode 62 and the reference electrode 34, and associating each measurement with the pH values (e.g., pH 4, 7, 10, etc.) corresponding to the pH of the monitoring fluids 53, 63 of the respective monitoring electrodes 52, 62. In this example, the monitoring fluid 53 comprises a first pH and the additional monitoring fluid 63 comprises a second pH different from the first pH. As the pH-sensitive glass membrane 28 of the pH sensing chamber ages, these voltages may again (or continually) be measured, and the equation approximating the relationship between pH and the measured voltage between the measuring electrode 22 and the reference electrode 34 may be updated in view of newly measured voltages (i) between the monitoring electrode 52 and the reference electrode 34 and (ii) between the additional monitoring electrode 62 and the reference electrode 34. In this manner, the pH determination algorithm may be calibrated based on (i) the voltage between the monitoring electrode 52 and reference electrode 34 and (ii) the voltage between the additional monitoring electrode 62 and the reference electrode 34. In particular, a conversion equation used by the pH determination algorithm to convert the measured voltage between the measuring electrode 22 and the reference electrode 34 into a pH value for the test sample may be modified based on (i) the voltage between the monitoring electrode 52 and reference electrode 34 and (ii) the voltage between the additional monitoring electrode 62 and the reference electrode 34.

In embodiments of the pH sensor 10 having two-point calibration functionality, the auto-calibration method may involve measuring an (i) initial voltage between the reference electrode 34 and the monitoring electrode 52 and (ii) an initial voltage between the reference electrode 34 and the additional monitoring electrode 62, wherein these initial voltages are measured prior to aging of the pH-sensitive glass of the pH sensor 10. For example, these initial voltages may be measured as part of the initial calibration of the pH sensor 10 before the pH sensor 10 is employed for use in an application. After the pH sensor 10 has been in use for some time, the auto-calibration method may involve again measuring (i) the voltage between the reference electrode 34 and the monitoring electrode 52 and (ii) the voltage between the reference electrode 34 and the additional monitoring electrode 62. First and second deviations may be found by subtracting the initial voltages from their respective voltages measured after some aging of the pH-sensitive glass, and these deviations may be used to calibrate the pH determination algorithm. In particular, a conversion equation used by the pH determination algorithm to convert the measured voltage between the measuring electrode 22 and the reference electrode 34 into a pH value for the test sample may be modified based on the first and second deviations.

The in-situ auto-calibration technique describe herein may be able to more accurately account for the diminished response of the pH-sensitive glass due to the fact that the glass electrodes (e.g., the pH-sensitive glass membrane 58 of the monitoring sensing chamber 56) in the reference chamber 32 are exposed to similar aging conditions as the pH-sensitive glass membrane 28 of the pH sensing instrumentation. Moreover, by making use of two- or multi-point auto-calibration, the pH sensor 10 can (i) compensate for reference electrode drift and (ii) recalibrate internally when the sensitivity of the pH-sensitive glass membranes fades with time and exposure. Returning to the analogy of the line connecting two points on a graph, the effects of aging combined with reference electrode drift will tend to change the slope and y-intercept of the calibration line from the originally calibrated response of the sensor. The y-intercept change may be attributable to the reference electrode drift, which may be determined from the voltage between the monitoring electrode 52 and reference electrode 34. The change in slope over time may be determined from the voltage between the additional monitoring electrode 62 and the reference electrode 34.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure. More specifically, although some aspects of the present disclosure are identified herein as preferred or particularly advantageous, it is possible that the present disclosure is not necessarily limited to these aspects. For example, while the primary embodiment of the present disclosure involves a pH sensor, the internal glass electrode concept can be viewed as a general solution for reference electrode correction across wide fields of electrochemistry, such as amperometry, voltammetry, or anywhere that reference electrodes featuring an electrochemical junction are found.

Moreover, it should be noted that while the present disclosure is directed towards a pH sensor, i.e., a hydrogen selective electrode, a pH sensor implements merely one form of an ion selective electrode (ISE). The principles and inventive concepts described herein could be applied to other types of ISEs, such as potassium selective or chloride selective electrodes.

The above embodiments, and the features of those embodiments, are exemplary and can be provided alone or in any combination with any one or more features of other embodiments provided herein without departing from the scope of the disclosure.

Further aspects of the present disclosure are provided by the subject matter of the following clauses:

According to a first aspect of the present disclosure, a pH sensor may comprise pH sensing instrumentation, reference sensing instrumentation, an electrochemical junction, and a pH determination unit. The pH sensing instrumentation may comprise: a pH fluid; a pH fluid chamber; a pH sensing chamber filled with the pH fluid and fluidly coupled to the pH fluid chamber; and a measuring electrode extending through the pH fluid chamber and comprising a tip that resides in the pH sensing chamber. The pH sensor may further comprise reference sensing instrumentation comprising: a reference fluid; a reference chamber filled with the reference fluid; a reference electrode immersed in the reference fluid; and monitoring instrumentation comprising. The monitoring instrumentation may comprise: a monitoring fluid; a monitoring fluid chamber; a monitoring sensing chamber filled with the monitoring fluid and fluidly coupled to the monitoring fluid chamber, wherein the monitoring fluid chamber and the monitoring sensing chamber are immersed in the reference fluid; and a monitoring electrode extending through the monitoring fluid chamber and comprising a tip that resides in the monitoring sensing chamber. The electrochemical junction may be configured to fluidly connect the reference fluid with a test sample placed in contact with the pH sensing chamber. The pH determination unit may be electrically connected to the measuring electrode of the pH sensing instrumentation, the reference electrode of the reference sensing instrumentation, and the monitoring electrode of the monitoring instrumentation.

A second aspect of the present disclosure may include the first aspect, wherein the reference electrode comprises a wire that is in contact with the reference fluid.

A third aspect of the present disclosure may include the second aspect, wherein the reference electrode is a Ag/AgCl electrode, a $Hg/Hg_2Cl_2$ electrode, a $Cu/CuSO_4$ electrode, a Hg/HgO electrode, or a ferric-ferrous electrode.

A fourth aspect of the present disclosure may include any one of the first through third aspects, wherein the monitoring fluid chamber comprises cylindrically shaped tube made of a pH-insensitive glass.

A fifth aspect of the present disclosure may include any one of the first through fourth aspects, wherein the monitoring sensing chamber comprises a hemispherical bulb made of a pH-sensitive glass.

A sixth aspect of the present disclosure may include any one of the first through fifth aspects, wherein the monitoring instrumentation further comprises: an additional monitoring fluid; an additional monitoring fluid chamber; an additional monitoring sensing chamber filled with the additional monitoring fluid and fluidly coupled to the additional monitoring fluid chamber, wherein the additional monitoring fluid chamber and the additional monitoring sensing chamber are immersed in the reference fluid; and an additional monitoring electrode extending through the additional monitoring fluid chamber and comprising a tip that resides in the additional monitoring sensing chamber, wherein the pH determination unit is electrically connected to the additional monitoring electrode.

A seventh aspect of the present disclosure may include the sixth aspect, wherein the reference electrode comprises a wire that is in contact with the reference fluid.

A eighth aspect of the present disclosure may include the sixth or seventh aspects, wherein the monitoring fluid comprises a first pH and the additional monitoring fluid comprises a second pH different from the first pH.

An ninth aspect of the present disclosure may include any one of the first through fifth aspects, wherein the monitoring instrumentation further comprises: a first additional monitoring fluid and a second additional monitoring fluid; a first additional monitoring fluid chamber and a second additional monitoring fluid chamber; a first additional monitoring sensing chamber filled with the first additional monitoring fluid and fluidly coupled to the first additional monitoring fluid chamber; a second additional monitoring sensing chamber filled with the second additional monitoring fluid and fluidly coupled to the second additional monitoring fluid chamber; a first additional monitoring electrode extending through the first additional monitoring fluid chamber and comprising a tip that resides in the first additional monitoring sensing chamber; and a second additional monitoring electrode extending through the second additional monitoring fluid chamber and comprising a tip that resides in the second additional monitoring sensing chamber, wherein the pH determination unit is electrically connected to the first additional monitoring electrode and the second additional monitoring electrode.

A tenth aspect of the present disclosure may include any one of the first through ninth aspects, wherein the pH sensor further comprises a ion-selective field effect transistor immersed in the reference fluid.

An eleventh aspect of the present disclosure may include any one of the first through tenth aspects, wherein the pH determination unit is configured to: measure a first voltage between the measuring electrode and the reference electrode; measure a second voltage between the reference electrode and the monitoring electrode; calculate a third voltage based on at least the first voltage and the second voltage; and convert the third voltage to a pH signal to determine the pH of the test sample.

According to a twelfth aspect of the present disclosure, a method of determining pH of a test sample may comprise providing a pH sensor, the pH sensor comprising: pH sensing instrumentation, reference sensing instrumentation, an electrochemical junction, and a pH determination unit. The pH sensing instrumentation may comprise: a pH fluid; a pH fluid chamber; a pH sensing chamber filled with the pH fluid and fluidly coupled to the pH fluid chamber; and a measuring electrode extending through the pH fluid chamber and comprising a tip that resides in the pH sensing chamber. The pH sensor may further comprise reference sensing instrumentation comprising: a reference fluid; a reference chamber filled with the reference fluid; a reference electrode immersed in the reference fluid; and monitoring instrumentation comprising. The monitoring instrumentation may comprise: a monitoring fluid; a monitoring fluid chamber; a monitoring sensing chamber filled with the monitoring fluid and fluidly coupled to the monitoring fluid chamber, wherein the monitoring fluid chamber and the monitoring sensing chamber are immersed in the reference fluid; and a monitoring electrode extending through the monitoring fluid chamber and comprising a tip that resides in the monitoring sensing chamber. The electrochemical junction may be configured to fluidly connect the reference fluid with the test sample. The pH determination unit may be electrically connected to the measuring electrode of the pH sensing instrumentation, the reference electrode of the reference sensing instrumentation, and the monitoring electrode of the monitoring instrumentation. The method of determining pH of the test sample may further comprise: contacting the pH sensing chamber and the electrochemical junction with the test sample; measuring a first voltage between the measuring electrode and the reference electrode; measuring a second voltage between the reference electrode and the monitoring electrode; calculating a third voltage based on at least the first voltage and the second voltage; and converting the third voltage to a pH signal to determine the pH of the test sample.

A thirteenth aspect of the present disclosure may include the twelfth aspect, wherein the reference electrode comprises a wire that is in contact with the reference fluid.

A fourteenth aspect of the present disclosure may include any one of the first or second aspects, further comprising measuring an initial second voltage, wherein the initial second voltage is a voltage between the reference electrode and the monitoring electrode prior to the reference electrode drifting due to contamination of the reference fluid.

A fifteenth aspect of the present disclosure may include the fourteenth aspect, further comprising calculating a drift of the reference electrode by subtracting the initial second voltage from the second voltage.

A sixteenth aspect of the present disclosure may include the fifteenth aspect, wherein calculating the third voltage based on at least the first voltage and the second voltage comprises subtracting the drift of the reference electrode from the first voltage.

A seventeenth aspect of the present disclosure may include any one of the twelfth through sixteenth aspects, wherein the monitoring instrumentation further comprises: an additional monitoring fluid; an additional monitoring fluid chamber; an additional monitoring sensing chamber filled with the additional monitoring fluid and fluidly coupled to the additional monitoring fluid chamber; and an additional monitoring electrode extending through the additional monitoring fluid chamber and comprising a tip that resides in the additional monitoring sensing chamber, wherein: the pH determination unit is electrically connected to the additional monitoring electrode; the method further comprises measuring a fourth voltage between the reference electrode and the additional monitoring electrode; and the third voltage is calculated based further on the fourth voltage.

An eighteenth aspect of the present disclosure may include the seventeenth aspect, wherein the monitoring fluid comprises a first pH and the additional monitoring fluid comprises a second pH different from the first pH.

A nineteenth aspect of the present disclosure may include the eighteenth aspect, wherein the pH sensing chamber comprises a hemispherical bulb made of a pH-sensitive glass, and wherein the method further comprises: measuring an initial second voltage and an initial fourth voltage, wherein the initial second voltage and the initial fourth voltage are a voltage between the reference electrode and the monitoring electrode and a voltage between the reference electrode and the additional monitoring electrode, respectively, prior to aging of the pH-sensitive glass; calculating a first deviation by subtracting the initial second voltage from the second voltage; calculating a second deviation by subtracting the initial fourth voltage from the fourth voltage; and calibrating a pH determination algorithm of the pH determination unit based on at least the first deviation and the second deviation.

A twentieth aspect of the present disclosure may include the nineteenth aspect, wherein calibrating the pH determination algorithm of the pH determination unit modifies a conversion equation used to convert the third voltage to the pH signal.

What is claimed is:

1. A pH sensor comprising:
   pH sensing instrumentation comprising:
     a pH fluid;
     a pH fluid chamber;
     a pH sensing chamber filled with the pH fluid and fluidly coupled to the pH fluid chamber; and
     a measuring electrode extending through the pH fluid chamber and comprising a tip that resides in the pH sensing chamber;
   reference sensing instrumentation comprising:
     a reference fluid;
     a reference chamber filled with the reference fluid;
     a reference electrode immersed in the reference fluid; and
   monitoring instrumentation comprising:
     a monitoring fluid;
     a monitoring fluid chamber;
     a monitoring sensing chamber filled with the monitoring fluid and fluidly coupled to the monitoring fluid chamber, wherein the monitoring fluid chamber and the monitoring sensing chamber are immersed in the reference fluid; and
     a monitoring electrode extending through the monitoring fluid chamber and comprising a tip that resides in the monitoring sensing chamber;
   an electrochemical junction configured to fluidly connect the reference fluid with a test sample placed in contact with the pH sensing chamber; and
   a pH determination unit electrically connected to the measuring electrode of the pH sensing instrumentation, the reference electrode of the reference sensing instrumentation, and the monitoring electrode of the monitoring instrumentation, wherein the pH determination unit is configured to:
     measure a first voltage between the measuring electrode and the reference electrode;
     measure a second voltage between the reference electrode and the monitoring electrode;
     calculate a third voltage based on at least the first voltage and the second voltage; and
     convert the third voltage to a pH signal to determine the pH of the test sample.

2. The pH sensor of claim 1, wherein the reference electrode comprises a wire that is in contact with the reference fluid.

3. The pH sensor of claim 2, wherein the reference electrode is a Ag/AgCl electrode, a $Hg/Hg_2Cl_2$ electrode, a $Cu/CuSO_4$ electrode, a Hg/HgO electrode, or a ferric-ferrous electrode.

4. The pH sensor of claim 1, wherein the monitoring fluid chamber comprises cylindrically shaped tube made of a pH-insensitive glass.

5. The pH sensor of claim 1, wherein the monitoring sensing chamber comprises a hemispherical bulb made of a pH-sensitive glass.

6. The pH sensor of claim 1, wherein the monitoring instrumentation further comprises:
   an additional monitoring fluid;
   an additional monitoring fluid chamber;
   an additional monitoring sensing chamber filled with the additional monitoring fluid and fluidly coupled to the additional monitoring fluid chamber, wherein the additional monitoring fluid chamber and the additional monitoring sensing chamber are immersed in the reference fluid; and
   an additional monitoring electrode extending through the additional monitoring fluid chamber and comprising a tip that resides in the additional monitoring sensing chamber,
   wherein the pH determination unit is electrically connected to the additional monitoring electrode.

7. The pH sensor of claim 6, wherein the reference electrode comprises a wire that is in contact with the reference fluid.

8. The pH sensor of claim 1, wherein the monitoring instrumentation further comprises:
   a first additional monitoring fluid and a second additional monitoring fluid;
   a first additional monitoring fluid chamber and a second additional monitoring fluid chamber;
   a first additional monitoring sensing chamber filled with the first additional monitoring fluid and fluidly coupled to the first additional monitoring fluid chamber;

a second additional monitoring sensing chamber filled with the second additional monitoring fluid and fluidly coupled to the second additional monitoring fluid chamber;
a first additional monitoring electrode extending through the first additional monitoring fluid chamber and comprising a tip that resides in the first additional monitoring sensing chamber; and
a second additional monitoring electrode extending through the second additional monitoring fluid chamber and comprising a tip that resides in the second additional monitoring sensing chamber,
wherein the pH determination unit is electrically connected to the first additional monitoring electrode and the second additional monitoring electrode.

9. The pH sensor of claim 1, wherein the pH sensor further comprises an ion-selective field effect transistor immersed in the reference fluid.

10. A pH sensor comprising:
pH sensing instrumentation comprising:
a pH fluid;
a pH fluid chamber;
a pH sensing chamber filled with the pH fluid and fluidly coupled to the pH fluid chamber; and
a measuring electrode extending through the pH fluid chamber and comprising a tip that resides in the pH sensing chamber;
reference sensing instrumentation comprising:
a reference fluid;
a reference chamber filled with the reference fluid;
a reference electrode immersed in the reference fluid; and
monitoring instrumentation comprising:
a monitoring fluid;
a monitoring fluid chamber;
a monitoring sensing chamber filled with the monitoring fluid and fluidly coupled to the monitoring fluid chamber, wherein the monitoring fluid chamber and the monitoring sensing chamber are immersed in the reference fluid;
a monitoring electrode extending through the monitoring fluid chamber and comprising a tip that resides in the monitoring sensing chamber;
an additional monitoring fluid;
an additional monitoring fluid chamber;
an additional monitoring sensing chamber filled with the additional monitoring fluid and fluidly coupled to the additional monitoring fluid chamber, wherein the additional monitoring fluid chamber and the additional monitoring sensing chamber are immersed in the reference fluid; and
an additional monitoring electrode extending through the additional monitoring fluid chamber and comprising a tip that resides in the additional monitoring sensing chamber,
wherein the monitoring fluid comprises a first pH and the additional monitoring fluid comprises a second pH different from the first pH;
an electrochemical junction configured to fluidly connect the reference fluid with a test sample placed in contact with the pH sensing chamber; and
a pH determination unit electrically connected to the measuring electrode of the pH sensing instrumentation, the reference electrode of the reference sensing instrumentation, the monitoring electrode of the monitoring instrumentation, and the additional monitoring electrode of the monitoring instrumentation.

11. A method of determining pH of a test sample, the method comprising:
providing a pH sensor comprising:
pH sensing instrumentation comprising:
a pH fluid;
a pH fluid chamber;
a pH sensing chamber filled with the pH fluid and fluidly coupled to the pH fluid chamber; and
a measuring electrode extending through the pH fluid chamber and comprising a tip that resides in the pH sensing chamber;
reference sensing instrumentation comprising:
a reference fluid;
a reference chamber filled with the reference fluid;
a reference electrode immersed in the reference fluid; and
monitoring instrumentation comprising:
a monitoring fluid;
a monitoring fluid chamber;
a monitoring sensing chamber filled with the monitoring fluid and fluidly coupled to the monitoring fluid chamber, wherein the monitoring fluid chamber and the monitoring sensing chamber are immersed in the reference fluid; and
a monitoring electrode extending through the monitoring fluid chamber and comprising a tip that resides in the monitoring sensing chamber;
an electrochemical junction configured to fluidly connect the reference fluid with the test sample; and
a pH determination unit electrically connected to the measuring electrode of the pH sensing instrumentation, the reference electrode of the reference sensing instrumentation, and the monitoring electrode of the monitoring instrumentation;
contacting the pH sensing chamber and the electrochemical junction with the test sample;
measuring a first voltage between the measuring electrode and the reference electrode;
measuring a second voltage between the reference electrode and the monitoring electrode;
calculating a third voltage based on at least the first voltage and the second voltage; and
converting the third voltage to a pH signal to determine the pH of the test sample.

12. The method of claim 11, wherein the reference electrode comprises a wire that is in contact with the reference fluid.

13. The method of claim 11, further comprising measuring an initial second voltage, wherein the initial second voltage is a voltage between the reference electrode and the monitoring electrode prior to the reference electrode drifting due to contamination of the reference fluid.

14. The method of claim 13, further comprising calculating a drift of the reference electrode by subtracting the initial second voltage from the second voltage.

15. The method of claim 14, wherein calculating the third voltage based on at least the first voltage and the second voltage comprises subtracting the drift of the reference electrode from the first voltage.

16. The method of claim 11, wherein the monitoring instrumentation further comprises:
an additional monitoring fluid;
an additional monitoring fluid chamber;
an additional monitoring sensing chamber filled with the additional monitoring fluid and fluidly coupled to the additional monitoring fluid chamber; and an additional monitoring electrode extending through the additional monitoring fluid chamber and comprising a tip that resides in the additional monitoring sensing chamber, wherein:
the pH determination unit is electrically connected to the additional monitoring electrode;
the method further comprises measuring a fourth voltage between the reference electrode and the additional monitoring electrode; and
the third voltage is calculated based further on the fourth voltage.

17. The method of claim 16, wherein the monitoring fluid comprises a first pH and the additional monitoring fluid comprises a second pH different from the first pH.

18. The method of claim 17, wherein the pH sensing chamber comprises a hemispherical bulb made of a pH-sensitive glass, and wherein the method further comprises:
measuring an initial second voltage and an initial fourth voltage, wherein the initial second voltage and the initial fourth voltage are a voltage between the reference electrode and the monitoring electrode and a voltage between the reference electrode and the additional monitoring electrode, respectively, prior to aging of the pH-sensitive glass;
calculating a first deviation by subtracting the initial second voltage from the second voltage;
calculating a second deviation by subtracting the initial fourth voltage from the fourth voltage; and
calibrating a pH determination algorithm of the pH determination unit based on at least the first deviation and the second deviation.

19. The method of claim 18, wherein calibrating the pH determination algorithm of the pH determination unit modifies a conversion equation used to convert the third voltage to the pH signal.

* * * * *